Patented Apr. 10, 1951

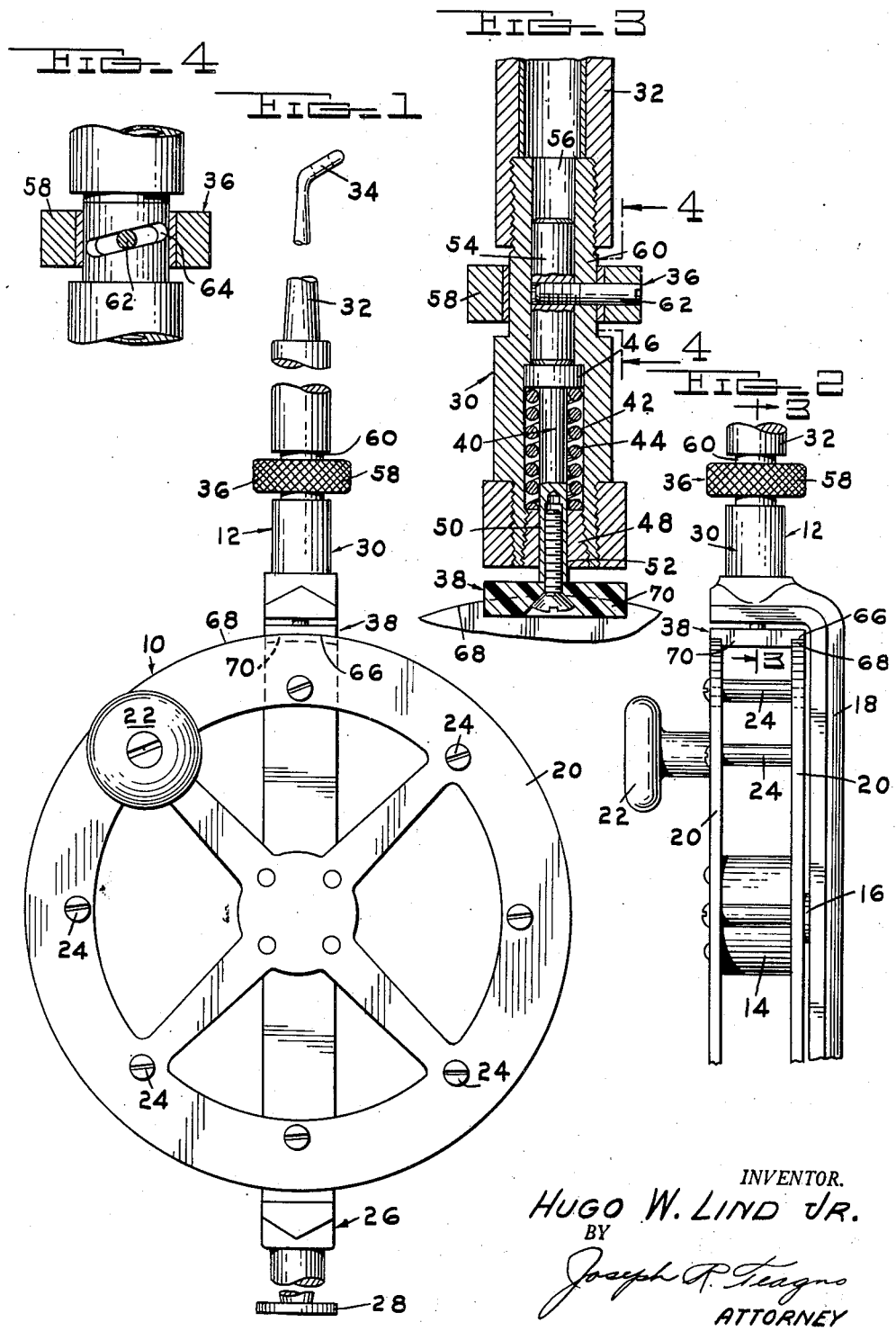

2,548,224

UNITED STATES PATENT OFFICE 2,548,224

FISHING APPARATUS

Hugo W. Lind, Jr., Detroit, Mich.

Application February 5, 1948, Serial No. 6,395

6 Claims. (Cl. 43—20)

This invention relates to rod and reel fishing equipment and more particularly to braking mechanism for a trolling fishing reel.

Broadly the invention comprehends the provision of a deep water trolling fishing reel in combination with a rod therefor having braking mechanism therefor incorporated in the hand gripping portion of the rod.

An object of the invention is the provision of simple, easily manipulated, and effective braking means for the trolling reels of deep-water fishing equipment.

Another object of the invention is the provision of deep-water rod and reel fishing equipment having braking means in the rod thereof for controlling the rotation of the reel.

Another object of the invention is the provision of a trolling rod and reel having braking means for the reel manually operable from the hand gripping portion of the rod for easily and effectively controlling the rotation of the reel in the operational use of the rod and reel.

A further object of the invention is the provision of a fishing reel having braking means therefor requiring low operating force.

Other objects and advantages of the invention will appear from the following description taken in connection with the drawings, forming a part of the specification, and in which:

Fig. 1 is a fragmentary top plan view of a deep water trolling rod and reel;

Fig. 2 is a fragmentary side plan view of Fig. 1;

Fig. 3 is a fragmentary enlarged vertical cross-sectional view taken substantially along line 3—3 of Fig. 2; and Fig. 4 is a fragmentary partially cross-sectional view looking in the direction of lines 4—4 of Fig. 3.

The instant invention is predicated upon the provision of a fishing reel primarily useful for deep water trolling having suitable braking mechanism therefor effective to minimize personal physical fatigue incident to reeling in or playing a fish that has been hooked. The present braking mechanism as applied to a deep water trolling fishing rod and reel incorporates three fundamental features for its practicability: (1) that of having a frictional braking surface arranged for frictional bearing relative to the reel at the external peripheral rim of the reel, (2) of having its actuating or control element arranged as a part of the rod holding or hand gripping portion, and (3) of providing a mechanical friction locking mechanism between the control element and frictional braking surface. By the arrangement of the braking surface at the maximum diameter of the reel and through the provision of the locking mechanism, a low force is solely required to effect a positive braking operation upon the reel even though an appreciably greater load or pull is being exerted upon the trolling line associated with the reel. With the actuating element arranged as part of the holding portion of the rod, a slight movement of the element is ample to cause a braking engagement of the frictional braking surface upon the reel and through the association of the element with its locking mechanism is maintained in frictional braking application.

Referring to the drawings for more specific details of the invention, 10 represents generally a deep water trolling fishing reel pivotally mounted upon an associated rod 12.

The reel 10 comprises a hub 14 suitably journalled upon a post 16 fixedly secured to the reel carriage portion 18 of the rod 12, a pair of apertured disks or wheels 20 axially spaced from one another on the hub and a knob 22 pivotally arranged on the disk 20 axially removed from the reel carriage near the external periphery thereof.

The disks 20 are supported relative to one another by a plurality of angularly spaced annularly arranged studs 24 forming a spool body for the trolling fishing line to be wound thereon.

The knob 22 is adapted to be grasped in the palm of the hand of the rod and reel user in the course of reeling in the line upon the spool body.

The rod 12 in addition to the reel carriage 18 comprises a lower handle portion 26 terminating in a knob 28, an upper handle or hand gripping portion 30 and a tapered tubular shaft 32 extending axially outwardly from the portion 30. The shaft 32 is adapted to have a plurality of line guides, not shown, and terminates in an end line guide 34.

The carriage 18 is axially offset to the handle portions 26 and 30 of the rod such that the reel supported thereon is nestled axially between the handle portions.

The handle portion 30 has incorporated therein a reel braking mechanism 36 comprising a brake shoe 38 adapted to have frictional bearing relation upon the external peripheral edge of the reel disks 20, a plunger 40 secured to the shoe for movement in a bore 42 in handle portion 30, and said plunger and brake shoe being normally and resiliently biased away from the reel by a spring 44 arranged in the bore intermediate a head 46 on the plunger and a plug 48 threaded in the end of bore 42 and supporting the stem 50 of plunger 40 in an opening 52 extending therethrough for axial movement therein.

The plunger is adapted to be actuated against the spring 44 by a thrust pin 54 arranged in a bore 56 concentrically arranged relative to and in communication with bore 42, said pin having one end thereof juxtaposed the head 46 opposite from the spring pressed side of the head. The pin 54 has associated therewith a collar member 58 arranged in encompassing relation upon a reduced annular portion 60 of handle 30 for movement thereon and relative thereto. The collar 58 is fixedly secured to thrust pin 54 by a screw 62 extending through a cam slot 64 arranged in the wall of portion 60 of handle 30. The cam slot extends angularly to the handle in an angle of reasonably small degree to a plane passing perpendicular to the axis of the rod. The angle of the slot determines the wedge or locking angle provided for resisting movement of brake shoe 38, plunger 40, and thrust pin 54 relative to the handle 30.

Because of the arrangement of structure of the collar 58, thrust pin 54, and slot 64, a rotation of collar 58 relative to the handle 30 effects an axial rotative movement of thrust pin 54 relative to the handle in an axial direction dependent on the direction of rotation.

As viewed in Figs. 3 and 4 of the drawings, it is to be noted that a counterclockwise rotation of collar 58 causes an axial movement of thrust pin toward and against plunger 40 effecting an axial movement of plunger 40 and brake shoe 38 toward the external peripheral surface of the reel.

The brake shoe 38 is in the form of a block having a pair of arcuate bearing surfaces 66, one adapted for frictional cooperation with each of the disks 20 against the respective external peripheral surfaces 68 thereof and includes a central body portion 70 extending between the arcuate bearing surfaces 66 and adapted to nestle between the disks 20 across the spool body thereof. The body portion 70 is of sufficient thickness such that regardless of the position of the brake shoe or element 38 relative to the reel it is in a position to materially inhibit the line adapted to be wound on the reel from moving off and out of the spool body.

The collar 58 is of a size relative to the handle portion 30 such as to be conveniently held in the palm of the hand of the rod user for the easy manipulation thereof in the use of the braking mechanism.

The major portions of the rod and reel with the exception of shaft 32, and braking mechanism are of aluminum construction so as to provide a structure of light weight for easy handling. The shaft for the purpose of added strength and flexibility is preferably made of steel tubing and the brake mechanism is of appropriate composition for effective mechanical movement relative to handle portion 30. The brake shoe is preferably made of plastic or like material so as to provide good frictional holding qualities relative to the reel disks 20.

In a normal use of the combined rod and reel structure 10—12 with a line properly wound on the reel and extending through the guides thereof wherein a fish has been hooked by a hook attached to the line and the fisherman using the fishing equipment desires to land the fish, the braking mechanism 36 plays a vital part.

As the fisherman proceeds to reel in and play the fish on his line so as not to lose the fish, it is necessary to properly reel in and let out the line at various intervals with a requirement of effective reel braking in-between. This braking operation can be performed in a quick, easy, and effective manner by the fisherman merely by a slight wrist movement of the hand holding, the upper handle portion 30 with the collar or brake actuating member 58 grasped in the palm of said hand. No appreciable fatigue is felt by the hand gripping and manipulating the collar 58 for a braking or brake releasing operation of the reel, as the work or load is not imposed upon the hand but is carried by the angular cam slot 64 through the wedge locking effect it has upon the body of screw 62 received in cam movement therein. The rate of unreeling of the line from reel 10 can be effectively controlled dependent upon the extent to which the brake bearing surfaces 66 are pressed into frictional holding engagement upon the external peripheral surfaces 68 of the disks 20.

With a requirement for braking the reel so as to limit the rate of unreeling of the line or for the full braking of the reel and line, the fisherman need but twist his hand in grasping collar 58 in a counterclockwise direction sufficient to move the collar in said direction relative to handle 30 causing a predetermined proportionate movement of thrust pin 54 against plunger 40 thereby moving the plunger against spring 44 and causing an axial movement of the arcuate bearing surfaces of brake shoe 38 into frictional engagement with the surfaces 68 of disks 20. The extent of counterclockwise movement of collar 58 relative to the handle determines the braking force imposed upon the reel for effecting full braking or retarded rotation thereof.

It is then merely necessary if a releasing of the braking action be desired to rotate the collar in a clockwise direction permitting the spring 44 to move the plunger 40, controlled by the extent of axial movement of thrust pin 54, axially in a direction away from the reel 10. This completes a cycle of actuation of the braking mechanism 36 relative to the reel.

Although braking mechanism 36 is illustrated in connection with a specific type of trolling rod and reel and comprises a specific arrangement of structure, the invention herein is to be limited only as defined by the appended claims.

What I claim is:

1. A fishing apparatus comprising a rod having a hand-holding portion, a reel pivotally mounted on the rod, and a brake mechanism in the hand-holding portion comprising a brake shoe engageable with the external periphery of the reel, an annular manually actuated brake shoe actuating member relatively movable in and to the rod and a resiliently biased plunger extending within the hand-holding portion connecting the brake shoe to the manually actuated member.

2. A fishing apparatus comprising a rod having a pair of hand-holding portions and a line supporting and guiding shaft extending axially from one of the holding portions, a reel pivotally mounted on the rod between the hand-holding portions, a braking mechanism for controlling the rotation of the reel comprising a brake shoe engageable with the external periphery of the reel, a manually actuated annular member arranged in one of the hand-holding portions and rotatable relative thereto for controlling the operation of the brake, a plunger extending axially centrally within the one hand-holding portion connecting the manually actuated member to the brake shoe and means incorporated between one of said hand-holding portions and the manually actuated member for resisting the release of the braking mechanism when applied.

3. A fishing apparatus comprising a rod having a hand-holding portion, a reel mounting portion, and a line supporting and guiding shaft extending axially from the hand-holding portion, a reel pivotally mounted on the reel mounting portion of the rod with its external periphery adjacent one end of the hand-holding portion oppositely disposed from the rod shaft, and a brake for the reel comprising a brake shoe engageable with the external periphery of the reel, means axially movable in centrally supported relation in the hand-holding portion of the rod supporting the brake shoe, and manually actuated means incorporated in the hand-holding portion rotatably and axially movable relative thereto for actuating the brake shoe and having a hand engaging portion of greater diameter than the hand-holding portion concentric thereto.

4. Deep sea fishing apparatus comprising a rod having a holding portion, a reel supporting portion, and a line supporting and guiding shaft, a reel pivotally mounted on the supporting portion of the rod and comprising a central hub, a pair of circular plates mounted on the hub spaced from one another and line supporting elements between the plates, a brake for the reel comprising a brake shoe supported on and axially movable relative to the hand-holding portion of the rod and having a pair of arcuate friction surfaces engageable respectively with the external peripheries of the circular plates and a portion thereof extending radially inward between the plates along the peripheral surfaces thereof, and a member incorporated concentric in the hand-holding portion between the axial extremities thereof and movable axially relative to the hand-holding portion for actuating the brake.

5. Deep sea fishing apparatus comprising a rod having a hand-holding portion, a reel supporting portion, and a line supporting and guiding shaft, a reel pivotally mounted on the supporting portion of the rod and comprising a central hub, a pair of circular plates mounted on the hub spaced from one another, line supporting elements between the plates, a brake for the reel comprising a reel engaging member having a pair of arcuate faces adapted to have engagement respectively with the external peripheral surface of the reel plates and having a portion of said member extending between the arcuate faces adapted to be continually arranged between the plates and extending slightly below the external peripheral surfaces thereof, resilient means in the hand-holding portion normally resisting movement of the arcuate face into engagement with the peripheral surfaces on the plates, an annular member supported on and extending radially outwardly beyond the external peripheral surface of the hand-holding portion manually movable axially rotatively relative to the hand-holding portion for actuating the reel engaging member, and cooperative means between the hand-holding portion and annular member for holding the reel engaging member upon a normal braking application thereof.

6. A fishing apparatus comprising a rod having a hand-holding portion, a reel pivotally mounted on the rod, and a brake mechanism for the reel comprising an annular manually engageable collar of greater diameter than the hand-holding portion arranged concentric to and intermediate the axial length of the hand-holding portion, a brake shoe having an arcuate surface engageable with the peripheral outer surface of the reel, an axially movable plunger disposed within the hand-holding portion between the brake shoe and said manually engageable collar, for transmitting motion therebetween, wedge locking means engageable between the collar and hand-holding portion, and spring means centrally arranged in the hand-holding portion opposing axial movement of the shaft and collar in one direction, said collar being axially and rotatably moveable whereas the plunger and brake shoe are solely axially moveable.

HUGO W. LIND, Jr.

REFERENCES CITED

The following references are of record in the file of this patent:

UNITED STATES PATENTS

| Number | Name | Date |
| --- | --- | --- |
| 1,452,808 | Lee | Apr. 24, 1923 |
| 1,605,710 | Ford | Feb. 26, 1925 |
| 1,648,824 | Rife | Nov. 8, 1927 |
| 2,208,493 | Brett | July 16, 1940 |
| 2,342,993 | Wright | Feb. 29, 1944 |

FOREIGN PATENTS

| Number | Country | Date |
| --- | --- | --- |
| 589,703 | France | Nov. 2, 1926 |